United States Patent
Kyrtsos

[19]

[11] Patent Number: 6,011,827
[45] Date of Patent: Jan. 4, 2000

[54] ELECTRONIC HUB ODOMETER

[75] Inventor: Christos T. Kyrtsos, Southfield, Mich.

[73] Assignee: Meritor Heavy Vehicles, L.L.C., Troy, Mich.

[21] Appl. No.: 09/010,106

[22] Filed: Jan. 21, 1998

[51] Int. Cl.$^7$ .................................................. G01C 21/00
[52] U.S. Cl. ........................... 377/24.1; 377/2; 377/16; 377/25
[58] Field of Search ................... 377/2, 16, 24.1, 377/25

[56] References Cited

U.S. PATENT DOCUMENTS

| | | | |
|---|---|---|---|
| 3,700,164 | 10/1972 | Slagle | 235/95 R |
| 3,735,103 | 5/1973 | Finley | 235/95 R |
| 3,739,270 | 6/1973 | Miller et al. | 324/166 |
| 3,780,272 | 12/1973 | Rohner | 235/150.2 |
| 4,167,699 | 9/1979 | Baker | 324/171 |
| 4,176,397 | 11/1979 | Crom et al. | 364/561 |
| 4,491,007 | 1/1985 | Crowdes, Jr. | 73/2 |
| 4,536,668 | 8/1985 | Boyer | 310/75 R |
| 4,682,287 | 7/1987 | Mizuno et al. | 364/561 |
| 4,697,278 | 9/1987 | Fleischer | 377/24 |
| 5,025,253 | 6/1991 | DiLullo et al. | 340/825.06 |
| 5,381,090 | 1/1995 | Adler et al. | 324/174 |
| 5,714,929 | 2/1998 | Liu | 340/441 |

*Primary Examiner*—Margaret R. Wambach
*Attorney, Agent, or Firm*—Howard and Howard

[57] ABSTRACT

A system for electronically measuring the distance that a wheel has traveled can be used on a tractor-trailer combination vehicle to independently monitor mileages for the tractor and the trailer. An axle on the tractor and an axle on the trailer each has a hub odometer system which can electronically measure and store mileages for its respective axle. The system is mounted on a wheel and includes a signal generating device and a semiconductor unit. The signal generating device generates an electrical signal proportional to the number of wheel revolutions and the semiconductor unit receives, counts, and stores the electrical signals. The electrical signals are relayed to an output device. The system can also be used on other types of vehicle.

20 Claims, 1 Drawing Sheet

ELECTRONIC HUB ODOMETER

BACKGROUND OF THE INVENTION

This application relates to a unique system for electronically measuring the distance that a tractor and/or a trailer has traveled by using a signal generating device at a wheel hub to generate, store, and transmit data to an output device.

Tractor-trailer vehicles are used to haul numerous types of cargo to various locations. One tractor may haul several different trailers in a single day as the tractor delivers a first trailer to one location, unloads the first trailer, picks up a second trailer and drives it to the next location, etc. Also, other tractors may be taking the unloaded trailers to new locations to be reloaded. Thus, the tractors and the trailers travel different distances resulting in different total mileages for any given day.

Because the trailers are hauled by different tractors it is often difficult to determine how many miles each trailer has traveled. Tractors have odometers which keep track of the total miles traveled by the tractor, but trailers typically do not have odometers. Thus, it is important for a vehicle operator to know how many miles a trailer has traveled during a specific day and how many total miles the trailer has traveled.

The most common method that is used to keep track of tractor mileage is a mechanical odometer that is well known in the art. Mechanical odometers, however, do not have the capability of storing data for each day of operation for a specific vehicle. Another disadvantage with a mechanical odometer is that it has a fixed ratio for a given tire size on the trailer, making it an inflexible unit. Other vehicles have used electronic hub odometers which utilize infrared LED to send data to a remote location or to send data to a micro computer. These systems are expensive and do not have the capability to store the data in the odometer itself. Also, these systems are not capable of storing data from other sensors and relaying that data to an output device when activated.

SUMMARY OF THE INVENTION

It would be desirable to have an inexpensive electronic odometer system which can be programmed to store various specific identifications for tractors or trailers and which is easily installed on a tractor or a trailer such that the mileages of the tractor and trailer can be independently monitored. The system is preferably flexible enough to handle various types of output devices such as portable hand-held computers, electronic displays, and transmitters and receivers for radio frequency signals. It is also desirable for the system to have the capability of receiving and storing other types of data from other sensors such as temperature sensors and speed sensors. Finally, a system is needed which can be programmed with service and maintenance information such as when the trailer brakes were changed and when the trailer axle was last lubricated.

A unique system for electronically measuring the distance that a wheel has traveled can be used generate, store, and transmit data to an output device. The system can be mounted on a tractor wheel, a trailer wheel or both. The wheel defines an axis of rotation wherein one complete rotation by the wheel about the axis of rotation is defined as a wheel revolution. A signal generating device and a storage unit are each mounted on the wheel. Preferably, the storage unit is a semiconductor unit. The signal generating device generates an electrical signal proportional to the number of wheel revolutions and the semiconductor unit receives, counts, and stores the electrical signals. When activated, the semiconductor unit relays the electrical signals to an output device. The output device can be of numerous different types including an electronic display, a portable hand-held computer, or a receiver for receiving radio frequency signal transmitted from the semiconductor unit by a transmitter.

The preferred inventive method for determining the distance that a wheel has traveled provides at least one wheel defining an axis of rotation wherein one complete rotation by the wheel about the axis of rotation is defined as a wheel revolution. A signal generating device mounted on the wheel generates an electrical signal proportional to the number of wheel revolutions. The signals are counted, stored and relayed to an output device.

By installing the electronic hub odometer on a tractor wheel and a trailer wheel, the present invention allows the mileage on both the tractor and the trailer to be independently monitored and can be used in conjunction with other sensors such as temperature and brake sensors to transmit and store other relevant and useful data. Moreover, the system is easily installed, easily maintained and is relatively inexpensive.

These and other features can be understood from the following specification and drawings, of which the following is a brief description.

DETAILED DESCRIPTION OF THE PREFERRED EMBODIMENT

Figure 1:
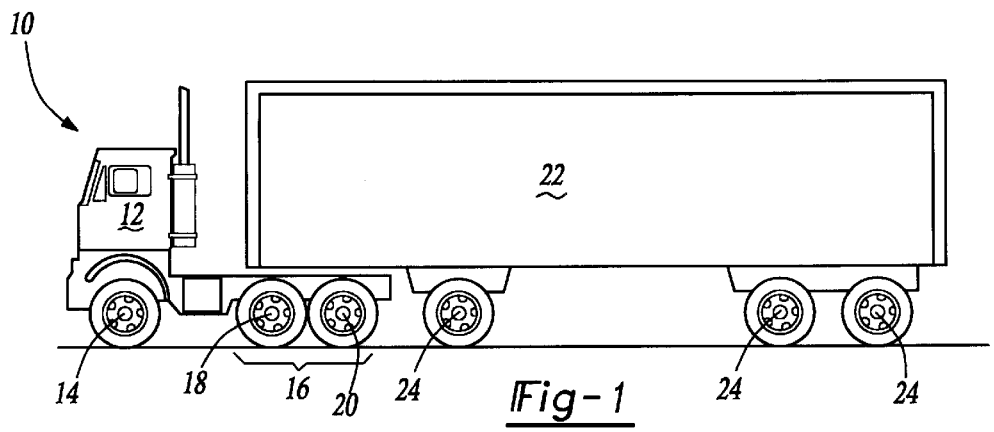
FIG. 1 side view of a vehicle using the inventive system.

Heavy vehicle 10, illustrated in FIG. 1, includes a tractor 12 with a front steering axle 14 and a rear tandem drive axle 16. The front steering axle 14 can be either a non-driving axle or a driving axle. The tandem drive axle 16 is comprised of a front drive axle 18 and a rear drive axle 20. The tractor 12 pulls a trailer 22 which has trailer axles 24. The trailer axles 24 are typically non-drive axles. The invention can be used on any vehicle such as a car, pick-up truck, or heavy vehicle 10. A heavy vehicle 10 is used only for descriptive purposes and is not intended as a limitation on the invention.

Figure 2:
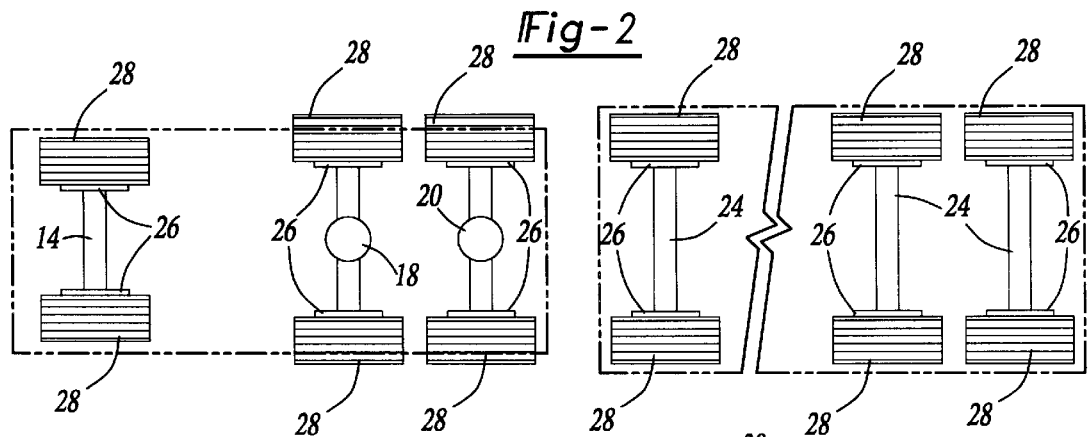
FIG. 2 is a simplified top view of the vehicle shown in FIG. 1.

As shown FIG. 2, each axle 14, 18, 20, 24 includes a brake assembly 26 mounted to a wheel 28. The brake assemblies 26 can be of various types known in the art, including drum brakes, disc brakes, air disc brakes, or wet disc brakes. The wheels 28 can also be of various configurations known in the art.

Figure 3:
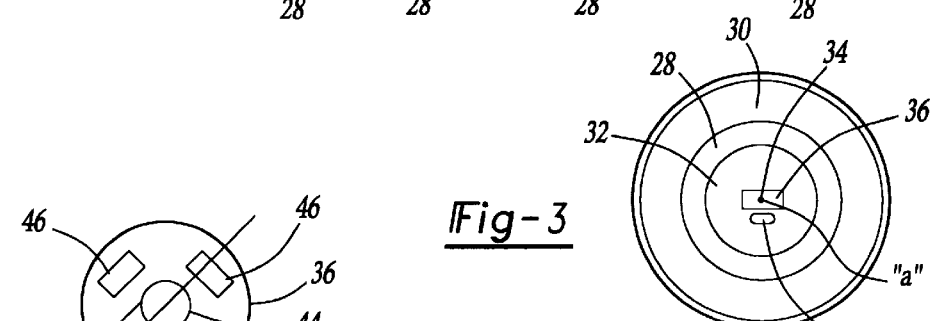
FIG. 3 is a side view of a wheel showing the invention system.

A tire 30 is mounted to each wheel 28, as shown in FIG. 3. The tires 30 support the vehicle 10 as it travels down the road. At the center of each wheel is a hub 32. The wheel defines an axis of rotation 34 which is concentric with the center of the hub 32. One complete rotation by the wheel 28 about the axis of rotation 34 is defined as wheel revolution. A signal generating device 36 is mounted on the hub 32 of the wheel 28. The signal generating device 36 generates an electrical signal proportional to the number of wheel revolutions made by the wheel 28. A semiconductor unit 38 is mounted adjacent to the signal generating device 36 on the hub 32 of the wheel 28. The semiconductor unit 38 receives, counts, and stores the electrical signals. Other storage devices can be utilized. The signal generating device 36 and the semiconductor unit 38 are mounted to the hub 32 by means well known in the art and are preferably fixed to the hub 32.

Figure 4:
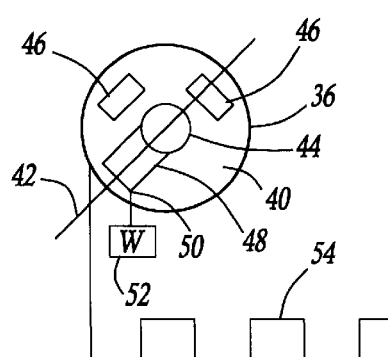
FIG. 4 is a schematic view of the inventive system.

A schematic view of the system for electronically measuring the distance that the wheel 28 has traveled is shown in FIG. 4. In the preferred embodiment, the signal generating device 36 is a unique inverted pendulum assembly which generates an electrical signal proportional to the number of wheel revolutions. Other signal generating devices known in the art may also be used, including a rotating ball and contact switch (not shown) or a reed switch used in combination with a rotating magnet. Optionally, the Hall effect could be used to count pulses from a tone ring attached to the hub. The important feature is that a signal needs to be produced which is proportional to the number of wheel revolutions.

The inverted pendulum assembly includes a first member 40 defining a pendulum axis of rotation 42 and having a central bore 44 concentric with the pendulum axis of rotation 42. At least one magnet 46 is mounted to the first member 40 and spaced radially from the central bore 44. A second member 48 is inserted into the central bore 44 and has an end 50 extending partially outwardly from the first member 40. A weighted member 52 is supported by the end 50 of the second member 48 such that the first member 40 rotates about the pendulum axis of rotation 42 with the wheel 28 while the second member 48 remains stationary. As the magnets 46 rotate past the stationary weighted member 52 an electrical pulse 54 is generated due to the electromagnetic field created by the magnets 46. Preferably the second member 48 is a smooth surfaced cylindrical rod which is inserted into the central bore 44 such that as the first member 40 rotates, the rod slips within the bore due to the smooth surface of the rod and the weight supported by the rod and thus, remains stationary. The electrical pulses 54 generated by the signal generating device 36 are transmitted to the semiconductor unit 38 where they are stored in memory. The pulses (which are proportional to the number of wheel revolutions) are then converted to mileage numbers and transmitted to an output device 58. As previously mentioned, the function performed by the inverted pendulum assembly could also be accomplished by a reed switch and magnet.

The signal generating device 36 is connected to the semiconductor unit 38 by a 1-wire (one wire) connection 56. One preferred type of connection is a product of Dallas Semiconductor and can handle numerous different inputs and outputs along a single wire connection. The one wire connection 56 has a common ground for each input and connects all input and output devices through one wire. Each device connected by the wire has the same protocol but has a specific identification such that the different signals transmitted via the wire can be recognized.

The electrical pules 54 generated by the signal generating device 36 are sent to the semiconductor unit 38 via the one wire connection 56. The semiconductor unit 38 has the capability of counting the number of pulses 54 received and can store this data. The semiconductor unit 38 can also transmit this data to an output device 58 along the one wire connection 56. It should be understood that the signal generating device 36, the semiconductor unit 38, the output device 58, and any other sensor devices could also be connected by a plurality of electrical wires by means well known in the art. The advantage of the one wire connection 56 is that the complexity of the electrical wiring is significantly reduced.

The output device 58 can be any one of various components. It can be a Personal Digital Assistant (PDA) or portable computer which can be electrically connected to the semiconductor unit 38 to download data. Examples of Personal Digital Assistants include the VSR PalmPilots™, the Sony Magic Link™, and the Newton Message Pad™. The output device 58 can also be a receiver unit where the semiconductor transmits the data via a radio frequency to the receiver. This would allow mileage information for vehicle fleets to be transmitted to a common fleet base station. Such systems may transmit through a satellite. The output device 58 can also be a permanent or detachable electronic display unit mounted to the vehicle 10. If permanently mounted it can be powered via the vehicle battery or can have its own power source. The electronic display could also be activated by a radio frequency signal such that information can be transmitted to and received from a base office. If a detachable electronic display is used it could also either be powered from the vehicle battery or have its own power source. The detachable unit would allow the unit to be easily removed from one vehicle and placed in another vehicle such that units from vehicles not in use can be utilized in currently operating vehicles.

A temperature sensor 60 can also be mounted to the wheel 28 so that the temperature of the wheel lubricant can be monitored. Optionally, the temperature sensor 60 can be mounted on one of the drive axles 18, 20 to monitor the oil temperature in the axle 18, 20. The temperature sensor 60 generates a temperature signal which is communicated to the output device 58 via the one wire connection 56. Thus, if the temperature exceeds a predetermined limit, a warning device 62 can be activated to indicate to the vehicle operator that the axle is overheating. The warning device 62 can also be activated if the number of electrical signals generated by the signal generating device 36 exceeds a predetermined limit, i.e., the vehicle 10 has traveled a maximum allowable distance and should have scheduled maintenance performed.

The inventive system can be used on both tractor axles 14, 16 and trailer axles 24. Mounting one system on a tractor axle 14, 18, or 20 and second system on a trailer axle 24 allows the mileages for the tractor 12 and the trailer 22 to be independently monitored. The system mounted to one of the wheels 28 on the tractor axle 14, 18, or 20 is identical to and operates in the same manner as the system mounted to the wheel 28 on the trailer axle 24. The electrical pulses 54 generated by the tractor wheel 28 and the trailer wheel 28 are relayed to their respective semiconductor units 38 which in turn transmit the data to the common output device 58.

A brake signal generating device 64 can also be mounted on the wheel 28 to monitor the number of times the brake assembly 26 on the wheel 28 has been actuated. The brake signal generating device 64 generates an electrical brake signal for every brake 26 application. These signals are counted and communicated to the output device 58 via the one wire connection 56.

The method for determining the distance that the wheel 28 has traveled requires at least one wheel 28 defining an axis of rotation 34 wherein one complete rotation by the wheel 28 about the axis of rotation 34 is defined as a wheel revolution. The signal generating device 36 is mounted on the wheel 28 which generates an electrical signal proportional to the number of wheel revolutions. The signals are counted, stored and relayed to the output device 58.

Other additional steps include mounting the semiconductor unit 38 adjacent to the signal generating device 36 and connecting the signal generating device 36 and the semiconductor unit 38 to the output device 58 with a one wire connection 56. Additionally, a temperature sensor 60 or a brake signal generating device 64 can be mounted to the wheel 28 to measure the wheel lubricant temperature and to count the number of brake applications, respectively. The temperature sensor 60 and the brake signal generating device 64 are also connected to the output device 58 via the one wire connection 56. The signals generated by the signal generating device 36, the brake signal generating device 64, and the temperature sensor 60 can be transmitted to the output device 58 in numerous ways. The signals can be electronically sent to a portable hand held computer that can be plugged into the vehicle or sent to an electronic display, or the signals can be transmitted to a receiver by a radio frequency signal.

The method steps that are utilized for a wheel 28 on the tractor 12 can also be simultaneously used on a wheel 28 for the trailer 22. Thus, the mileages for the tractor 12 and the trailer 22 can be independently monitored using the same method. This is accomplished by mounting identical systems on the wheel 28 for the tractor 12 and the wheel 28 for the trailer 22. Specific identification numbers can be programmed into the semiconductor unit 38 for each wheel 28 so that the data stored in the respective semiconductor unit 38 is specifically identified with its wheel 28 when the data is relayed to the output device 58. In fact, there are enough unique identification numbers such that each tire on the vehicle can be identified, which cold be helpful to tire manufacturers.

Finally, the method also includes the step of activating a warning device 62 if the number of signals generated by the signal generating device 36 exceeds a predetermined limit. This warning might indicate that the vehicle has traveled a specific distance and is ready for regular maintenance. The warning device could also be activated if the number of brake signals generated by the brake signal generating device 64 has exceeded a predetermined limit.

The advantage of the inventive system for independently monitoring tractor and trailer mileages is that it can permanently store this mileage information so that it can be accessed at a later time while still having the capability of transmitting the information to an output device 58 while the vehicle is operating. The system can also be used in conjunction with other sensors, such as the temperature sensor 60 and/or the brake signal generating device 64, to store and transmit other relevant data. The system is versatile, easily installed, and is relatively inexpensive.

Also, there is enough memory in the system so that other information can be stored pertaining to the tractor 12 or trailer 22. For example, desired routes and delivery schedules for a specific time period could easily be stored in the unit. Additionally, delivery information such as what was delivered, who delivered it, and when it was delivered can all be stored in the unit. Finally, service and repair dates for the tractor 12 and/or the trailer 22 can also be stored in the unit.

The operation and structure of the electronic components is as known. It is the combination and application of this system which is inventive.

Preferred embodiments of this invention have been disclosed, however, a worker of ordinary skill in the art would recognize that certain modifications would come within the scope of this invention. For that reason the following claims should be studied to determine the true scope and content of this invention.

We claim:

1. A method for determining the distance that a wheel has traveled comprising the steps of:

1) providing at least one wheel defining an axis of rotation wherein one complete rotation by the wheel about the axis of rotation is defined as a wheel revolution;

2) mounting a signal generating device on the wheel;

3) generating an electrical signal proportional to the number of wheel revolutions;

4) mounting a storage unit on the wheel;

5) counting the signals;

6) storing the signals; and 7) relaying the signals to an output device.

2. A method as recited in claim 1 further including the steps of providing a semiconductor assembly as the storage unit, mounting the semiconductor assembly adjacent to the signal generating device wherein the semiconductor assembly receives, counts, and stores the electrical signals generated by the signal generating device.

3. A method as recited in claim 1 further including the step of transmitting the signals to the output device via a radio frequency signal.

4. A method as recited in claim 1 further including the steps of mounting a temperature sensor on the wheel, measuring the lubricant temperature with the temperature sensor, generating a temperature signal, and relaying the temperature signal to the output device.

5. A method as recited in claim 1 further including the steps of providing a brake assembly mounted on the wheel for reducing wheel rotation speed when activated, mounting a brake signal generating device on the brake assembly, generating a signal for each brake application, counting the brake application signals, and relaying the brake application signals to the output device.

6. A method as recited in claim 1 further including the steps providing an additional wheel such that the at least one wheel is comprised of a first wheel for supporting a tractor and a second wheel for supporting a trailer, mounting a second signal generating device on the second wheel, generating an second electrical signal proportional to the number of wheel revolutions for the second wheel, counting the second electrical signals, storing the second electrical signals, and relaying the second electrical signals to the output device.

7. A method as recited in claim 6 further including the steps of mounting a first semiconductor unit adjacent to the first signal generating device on the first wheel and mounting a second semiconductor unit adjacent to the second signal generating device on the second wheel wherein the first and second semiconductor units receive, count, and store the first and second electrical signals respectively.

8. A method for determining the distance that a wheel has traveled comprising the steps of:

providing a first wheel and a second wheel each defining an axis of rotation wherein one complete rotation by each wheel about the respective axis of rotation is defined as a wheel revolution wherein the first wheel is for supporting a tractor and the second wheel is for supporting a trailer;

mounting a first signal generating device on the first wheel;

generating a first electrical signal proportional to the number of first wheel revolutions;

mounting a second signal generating device on the second wheel;

generating a second electrical signal proportional to the number of wheel revolutions for the second wheel;

counting the first and second signals;

storing the first and second signals;

mounting a first semiconductor unit adjacent to the first signal generating device on the first wheel and mounting a second semiconductor unit adjacent to the second signal generating device on the second wheel wherein the first and second semiconductor units receive, count, and store the first and second electrical signals respectively;

storing a first identification number representing a specific tractor in the first semiconductor unit, storing a second identification number representing a specific trailer in the second semiconductor unit, programming additional vehicle travel and service information into the first and second semiconductor units, and receiving separate summaries for each identification number from the output device; and relaying the first and second signals to an output device.

9. A system for electronically measuring the distance that a wheel has traveled comprising:

at least one wheel defining an axis of rotation wherein one complete rotation by said wheel about said axis of rotation is defined as a wheel revolution;

a signal generating device mounted on said wheel for generating an electrical signal proportional to the number of wheel revolutions;

a storage unit mounted on said wheel adjacent to said signal generating device for receiving, counting, and storing said electrical signals; and an output device for receiving said electrical signals from said storage unit when activated.

10. A system as recited in claim 9 wherein said wheel includes a hub, concentric with said wheel and rotatable about said axis of rotation, said signal generating device being mounted to said hub.

11. A system as recited in claim 9 wherein said storage unit is a semiconductor unit.

12. A system as recited in claim 9 wherein said semiconductor unit is connected to said output device via a wire.

13. A system as recited in claim 9 wherein said semiconductor transmits said electrical signals to a receiver via a radio frequency signal.

14. A system as recited in claim 9 including a temperature sensor mounted to said wheel for measuring a temperature of lubricant while said wheel is rotating, and a warning device for indicating that said temperature of said lubricant has reached a predetermined limit.

15. A system as recited in claim 14 including a one wire connection wherein said signal generating device communicates with said storage unit, said storage unit communicates with said output device, and said temperature sensor communicates with said output device via said one wire connection.

16. A system as recited in claim 9 including an additional wheel wherein said at least one wheel is comprised of a first wheel for supporting a tractor and a second wheel for supporting a trailer, said second wheel defining a second axis of rotation wherein one complete rotation by said second wheel about said second axis of rotation is defined as a wheel revolution for said second wheel.

17. A system as recited in claim 9 including a brake assembly mounted to said wheel for decreasing wheel rotation speed when activated, said brake assembly including a brake signal generating device for generating a brake signal for each brake application and a counter for counting said brake signals.

18. A system as recited in claim 9 wherein said signal generating device includes an inverted pendulum assembly for generating a signal for each of said wheel revolutions including a first member defining a pendulum axis of rotation and having a central bore concentric with said pendulum axis of rotation, at least one magnet mounted to said first member and spaced radially from said central bore, a second member inserted into said central bore and having an end extending partially outwardly from said first member, a weighted member supported by said end of said second member wherein said first member rotates about said pendulum axis of rotation with said wheel while said second member remains stationary such that as said magnets rotate past said stationary weighted member an electrical pulse is generated.

19. A system for electronically measuring the distance that a vehicle has traveled comprising:

a tractor having at least one tractor axle with a first wheel defining a first axis of rotation wherein one complete rotation by said first wheel about said first axis of rotation is defined as a wheel revolution;

a trailer having at least one trailer axle with a second wheel defining a second axis of rotation wherein one complete rotation by said second wheel about said second axis of rotation is defined as a wheel revolution;

a first signal generating device mounted on said first wheel for generating a first electrical signal proportional to the number of wheel revolutions for said first wheel;

a second signal generating device mounted on said second wheel for generating a second electrical signal proportional to the number of wheel revolutions for said second wheel;

a first semiconductor unit mounted on said first wheel adjacent to said first signal generating device for receiving, counting, and storing said first electrical signals;

a second semiconductor unit mounted on said second wheel adjacent to said second signal generating device for receiving, counting, and storing said second electrical signals; and an output device for receiving said first and second electrical signals from said first and second semiconductor units, respectively, when activated.

20. A system as recited in claim 19 including a first temperature sensor mounted to said first wheel for measuring a first wheel lubricant temperature and generating a first temperature signal and a second temperature sensor mounted to said second wheel for measuring a second wheel lubricant temperature and generating a second temperature signal wherein said first and second temperature signals are transmitted to said output device.

* * * * *